No. 642,580. Patented Feb. 6, 1900.
F. J. F. BRUGUIERE.
APPARATUS FOR PRODUCING VACUUM.
(Application filed May 8, 1899.)
(No Model.) 3 Sheets—Sheet 1.

Fig. 1.

No. 642,580. Patented Feb. 6, 1900.
F. J. F. BRUGUIERE.
APPARATUS FOR PRODUCING VACUUM.
(Application filed May 8, 1899.)
(No Model.) 3 Sheets—Sheet 3.

UNITED STATES PATENT OFFICE.

FREDERICK J. F. BRUGUIERE, OF NEW ORLEANS, LOUISIANA.

APPARATUS FOR PRODUCING VACUUM.

SPECIFICATION forming part of Letters Patent No. 642,580, dated February 6, 1900.

Application filed May 8, 1899. Serial No. 715,984. (No model.)

*To all whom it may concern:*

Be it known that I, FREDERICK J. F. BRUGUIERE, a citizen of the United States, residing at New Orleans, in the parish of Orleans and State of Louisiana, have invented new and useful Improvements in Apparatus for Producing Vacuum, of which the following is a specification.

My invention relates to an apparatus for producing a vacuum or partial vacuum in a closed vessel by the explosion or quick combustion of a volatilizable hydrocarbon therein and utilizing such vacuum to raise water or other liquid. It is designed more particularly as an improvement upon the apparatus disclosed in my Letters Patent No. 599,381, of February 28, 1898; and it consists in the peculiar highly-efficient and otherwise advantageous apparatus hereinafter described, and particularly pointed out in the claims appended.

In the annexed drawings.

In the said drawings similar letters designate corresponding parts in all of the several views, referring to which A is the vacuum-chamber of the apparatus, which forms part of the closed vessel and is provided with a water-inlet $a$, controlled by a downwardly-seating non-return valve $b$, and also with a water-outlet $c$. This latter communicates with a box $d$, having an opening $e$ in its top controlled by a downwardly-seating non-return valve $f$, the purpose of which is to permit water to pass out of the box and check its return. The box $d$ is contained in a receptacle $g$, which, as best shown in Fig. 3, extends above the box and is therefore enabled after each discharge of water from the vacuum-chamber to retain a sufficient quantity of water above valve $f$ to form a water seal, and thereby prevent air from entering the said chamber.

B is a float arranged in the receptacle $g$ and having guide-rods $h$ $h'$, the latter of which is equipped with a lateral projection $i$, adjustably fixed on a threaded portion thereof by nuts $i^4$ for a purpose presently described.

C is an explosion-chamber, which is preferably U-shaped and terminates at one end in a downwardly-disposed discharge $j$, arranged in the vacuum-chamber A, and at its opposite end in a cock $k$. Said explosion-chamber is provided adjacent to its outer end with a lateral arm $l$, which connects it to an exhaust-conduit $m$, containing a non-return clack-valve $n$. The arm $l$ also serves to connect the explosion-chamber C with a fuel-supply conduit D. This latter conduit is preferably made up of a pipe-section $p$, connected to the arm of the explosion-chamber and also to the exhaust-conduit, a chamber $q$ at the outer end of the section $p$, a cylinder $r$, arranged in the chamber and having openings $s$, whereby its interior is connected with that of the chamber and free movement of a cut-off valve, hereinafter described, is insured, and a pipe $t$, which is interposed between the chamber $q$ and a carbureter E and is provided with a non-return valve $u$, designed to open in the direction indicated by arrow. (See Fig. 1.) Said pipe $t$ is also provided with an outwardly-opening clack-valve $v$, the purpose of which will hereinafter be explained.

The carbureter E (shown in Fig. 4) preferably comprises a casing $w$ and a plurality of foraminated plates $x$, arranged one above the other. A free-air-supply pipe $y$ is connected to the lower end of the casing, while the pipe $t$ and a fuel-supply pipe $z$ are connected to the upper end thereof. The said fuel-supply pipe is provided with a cock $a'$ and a non-return valve $b'$, designed to open in the direction of arrow. (See Fig. 1.) It is also provided with a branch $c'$, designed to be connected with a source of gasolene or other fuel supply, (not shown,) and a branch $d'$, which leads to a pump-cylinder $e'$. (Best shown in Fig. 2.) In the cylinder $e'$ is a piston $f'$, the downward movement of which is limited by a screw $g'$. When the said piston is reciprocated by means presently described, it serves on the upstroke to draw gasolene through the branch pipe $c'$ past a check-valve $h^2$ therein and on its downstroke to force the gasolene through the pipe $z$, and thus maintain the supply to carbureter E.

Figure 1:
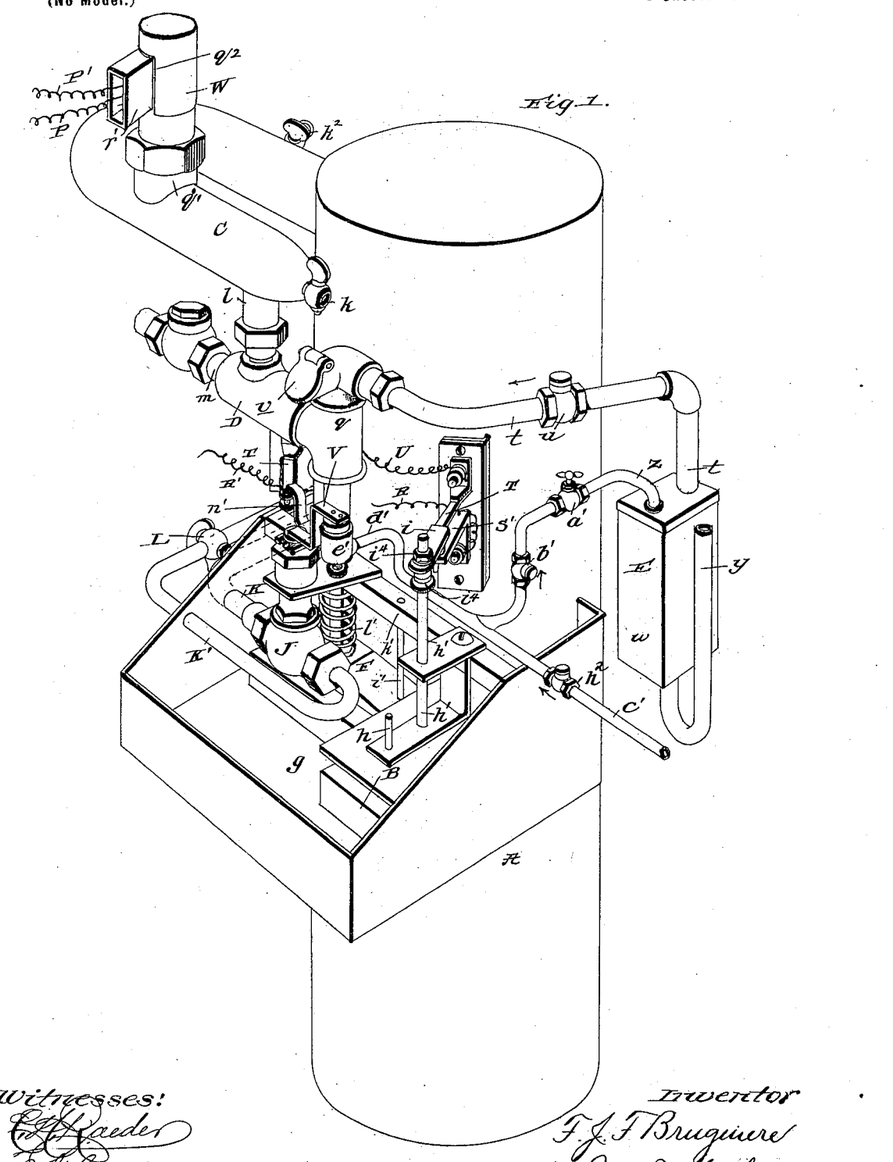
Figure 1 is a perspective view of my improved apparatus.
Figure 2:
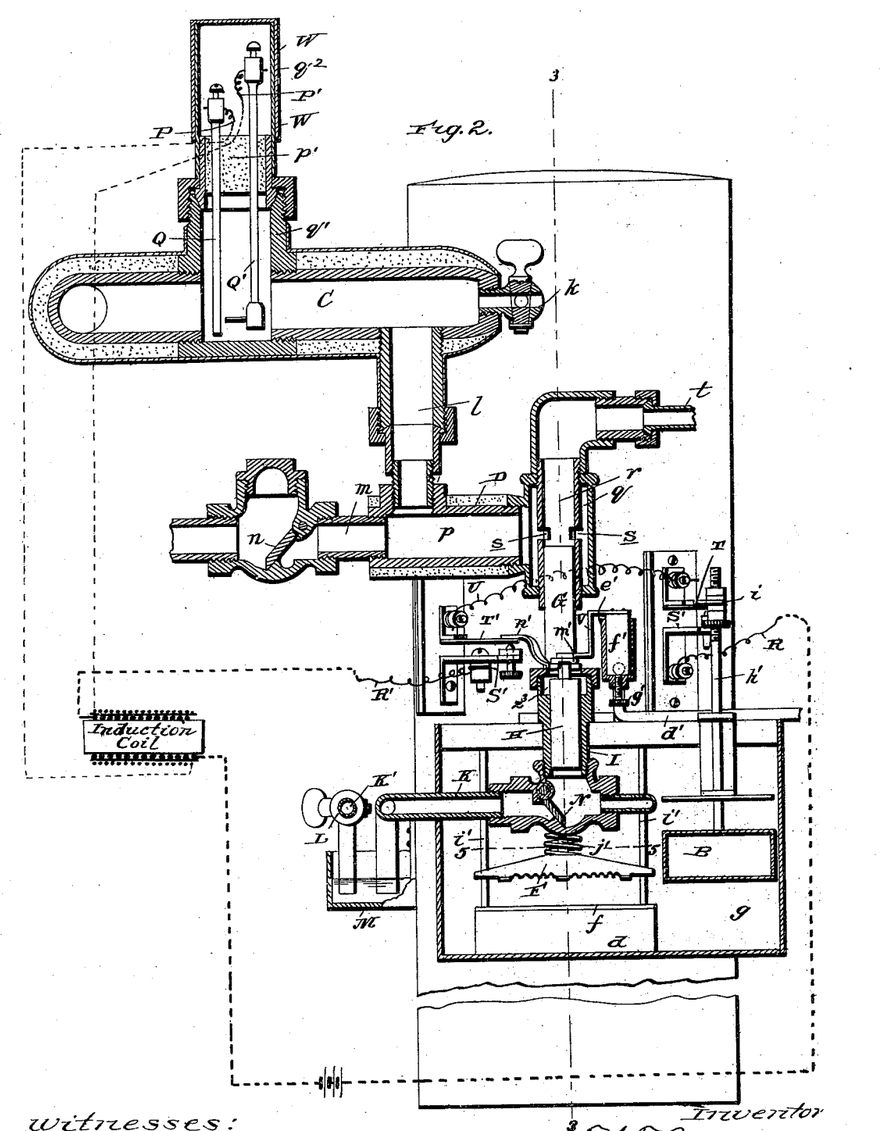
Fig. 2 is a vertical section taken on line 2 2 of Fig. 3.
Figures 3, 4, 5, 6:
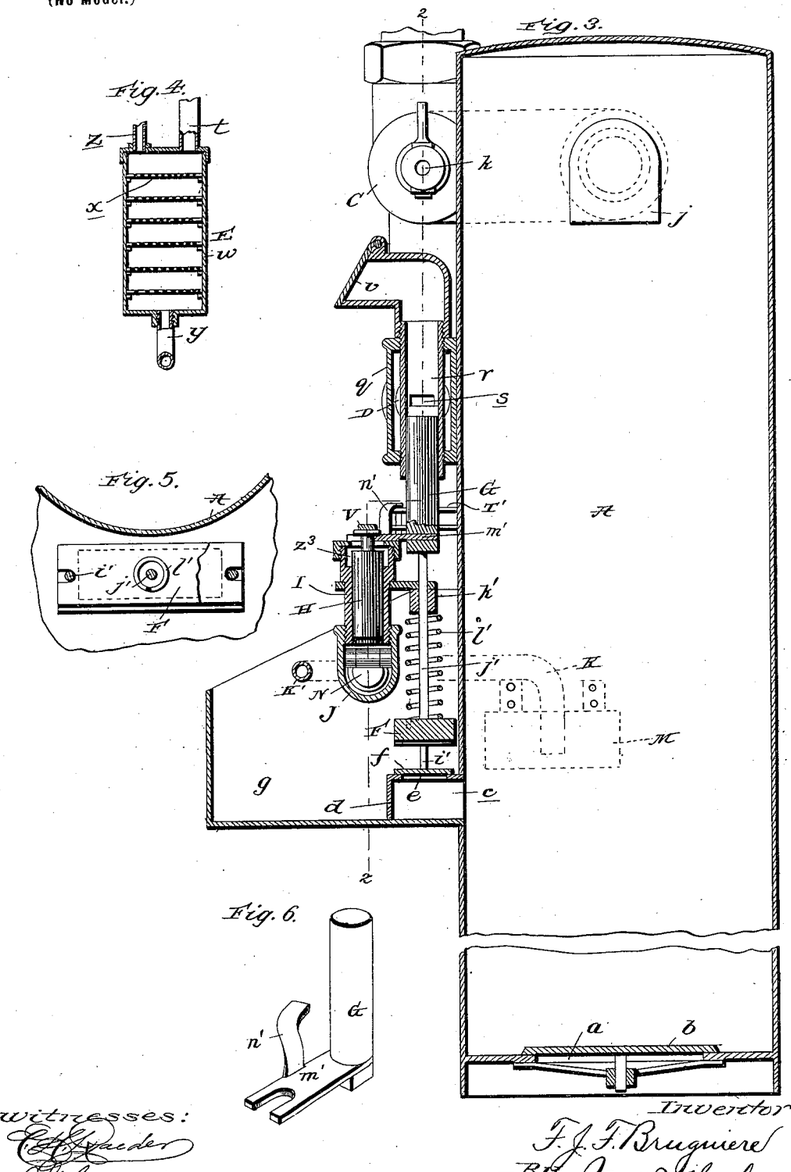
Fig. 3 is a vertical section taken on line 3 3 of Fig. 2.
Fig. 4 is a detail vertical section of the carbureter.
Fig. 5 is a detail section taken on line 5 5 of Fig. 2.
Fig. 6 is a perspective view of the cut-off valve.

In Fig. 2 the upper end of the screw $g'$ is shown as flush with the bottom of the cylinder $e'$ and the piston $f'$ is shown as fully occupying the cylinder and bearing at its lower end on the cylinder-bottom and the upper end of the screw.

F is a follower arranged on guide-rods $i'$ above the valve $f$. This follower is provided with a rod $j'$, extending loosely through a bracket $k'$ and is backed by a spring $l'$, which has for its purpose to cushion the up movements of the follower and return it to its normal position adjacent to the valve $f$.

G is a cut-off valve movable in the cylinder $r$ of the fuel-supply conduit D and normally resting in the position shown in Fig. 2, so as to permit the passage of explosive mixture to the explosion-chamber. In such normal position the cut-off valve bears on the upper end of the rod $j'$ of the follower F.

At or adjacent to its lower end the cut-off valve G is provided with a lateral bifurcated arm $m'$, which in turn has a lateral projection $n'$, designed to serve as a circuit maker and breaker for a purpose presently described. The bifurcation of the arm $m'$ receives the neck of a governor-piston H, which is arranged and adapted to move in a cylinder I, having a valve-casing J at its lower end. The opposite ends of this valve-casing are connected by pipes K K' (the latter of which has a valve L) with a lubricant-receptacle M, and the non-return valve N in said casing is arranged between the valveless pipe K and the cylinder I for a purpose presently described.

P P' are wires which form a part of the secondary circuit of an induction-coil, as shown in Fig. 2, and Q Q' are conducting-rods electrically connected with the wires P P' and extending through insulating material $p'$ in a branch $q'$ of the explosion-chamber C into said chamber.

R R' are wires which form a part of the primary circuit of the induction-coil and are electrically connected to fixed contact-pieces S S', respectively. The contact-pieces S S' are arranged beneath resilient contact-pieces T T', respectively, and the said resilient pieces T T', which are electrically connected by a wire U and normally rest away from the contact-pieces S S', are in turn arranged below the projection $i$ of the float-rod $h'$ and the projection $n'$ on the arm $m'$ of the cut-off valve G, respectively.

V is an arm attached to the pump-piston $f'$ and arranged to bear on the upper end of the governor-piston H.

Over the lateral branch $q'$ of the explosion-chamber C is arranged a removable hood W. This hood W has a bifurcation $q^2$ to receive the lateral conduit $r'$ for the passage of wires P P' and is designed, in conjunction with the said conduit $r'$, which is inclined downwardly from the branch $q'$, to prevent water and other liquid from gaining access to and forming a short circuit between the conducting-rods Q Q'. In order to prevent gasolene or moisture from forming a short circuit between the conducting-rods Q Q' within the arm $q'$ of the explosion-chamber C, the said rods Q Q' are disposed vertically and are arranged to depend from their support, which is the insulating material $p'$, as shown in Fig. 2.

The practical operation of the apparatus is as follows: When the valve $f$ is forced up by the discharge of water and air from chamber A, which is coincident with an explosion in said chamber, the follower F and the cut-off valve G will also be forced upwardly, with the result that the ports $s$ in cylinder $r$ are closed and the vacuum created by the explosion is prevented from drawing explosive mixture through the conduit D. The clack-valve $v$ permits the escape of air pushed before the valve G, and hence prevents compression of the air, which would tend to quickly force said valve G downwardly. Prior to the closing of the valve G flames and sparks are prevented from reaching the carbureter by the non-return valve $u$, and consequently all danger of a back explosion is removed. Water leaves the chamber A by gravity through port $c$, and when the valve G has descended sufficiently to uncover the ports $s$ explosive mixture is drawn into the vacuum-chamber and the explosion-chamber. The explosion-chamber having been heated by the passage of the products of combustion of the previous explosion therethrough and being calculated to retain the heat by reason of its being covered with non-conducting material $z'$, it follows that the explosive mixture will be heated and rendered highly inflammable in the explosion-chamber. Subsequent to the raising of the cut-off valve G through the medium of valve $f$ and follower F, as described, the spring $l'$ forces the follower down upon and positively returns the valve $f$ to its seat and then raises said follower to its normal position slightly above the valve $f$, so as to allow free action of said valve $f$. The descent of the said cut-off valve G is, however, controlled by the descent of the governor-piston H and may be rendered fast or slow by opening the valve L of the pipe K' to a greater or less extent, and thereby diminishing or increasing the resistance offered to the descent of said piston. The float B is raised by the sudden rush of water which enters the receptacle G when the chamber A is discharged and is held in its raised position until the discharge of water from chamber A ceases, when it will move downwardly and, through the medium of its lateral projection $i$, press and hold the resilient contact-piece T against the fixed contact-piece S. The primary circuit of the induction-coil is not complete until the contact-piece T' is pressed against the contact-piece S' by the projection $n$ of cut-off valve G, and the contact-piece T is pressed against the contact-piece S by the projection $i$ on the rod of the fallen float B in the order named, and hence it follows that the intervals between explosions may be increased or diminished in length by closing the valve L to a greater or less extent. When the contact-piece T is pressed against the contact-piece S, as stated, a spark will be formed between the conducting-rods Q Q' and an explosion will ensue. The contact-piece T is held by the projection $n$ of cut-off valve G against the contact-piece S', and the contact-piece T is held by the projection $i$ of float B against contact-piece S until an explosion takes place and said valve G and float B are forced upwardly. By virtue of this an arc is maintained or sparks are formed between the conductors Q Q' until an explosion takes place. When it is remembered that the charge of explosive mixture is a varying charge, this will be appreciated as a highly-important feature of my invention, for it will be readily understood that if the float-spark fails to ignite the mixture presented to it one of the succeeding sparks will certainly cause an explosion, and thereby insure the continuous operation of the apparatus. The formation of the spark in the explosion-chamber C, where the explosive mixture is richer and more highly heated than at any other point, and the subsequent discharge of the flame and products of combustion downwardly from the inner end of the explosion-chamber insure the ignition and complete combustion of the comparatively poor explosive mixture in the vacuum-chamber. When the said explosion takes place, the vacuum created is occupied by water, which rushes up through opening $a$, and the operation described is repeated. In the operation described the explosions take place after the rush of water from chamber A ceases, the projection $i$ on the rod $h'$ of float B being adjusted so as to only press the contact-piece T against the contact-piece S, when the float descends and the valve L being closed more or less, according to the length of interval desired between the explosions.

The means described for governing the descent of the cut-off valve G and also the closing of the primary circuit of the induction-coil forms a highly-important feature of my invention, since it enables the operator to readily increase or diminish the pumping capacity of the apparatus. When the valve L of such means is set so that the explosions will take place at short intervals, the projection $i$ of the float B is adjustably fixed on the rod of said float by the nuts $i^4$, so that the float will be suspended from the resilient contact-piece T, and hence will continuously hold said resilient contact against the contact S. When the contact T is thus continuously held against the contact S, the primary circuit of the induction-coil is completed and a spark is formed in the explosion-chamber when the contact T' is pressed by the projection $n$ of the cut-off valve against the contact S'.

It will be appreciated from the foregoing that the piston H, cylinder I, and the means for regulating the discharge of fluid from the lower portion of the cylinder constitute what may, with propriety, be broadly denominated an adjustable governor for regulating the descent of the cut-off valve G and the circuit maker and breaker.

The governor-piston H operates by suction to raise the liquid from the receptacle M to the enlargement $z^3$ at the upper end of the cylinder I, where it serves as a packing to exclude air from said cylinder I and at the same time lubricates the piston and renders easy the movements of the same. The valve N, below the governor-piston, is calculated to open on the upstroke of the piston to permit the passage of liquid to the cylinder I and close on the down movement of said piston, so as to enable the valve L to control the descent of the same.

The upward movement of the piston H acts against arm V, and thereby raises the pump-piston $f'$ and draws gasolene or fuel through pipe $c'$ and past the check-valve $h^2$. The upward stroke of the piston $f'$, and hence the quantity of gasolene which is drawn past the valve $h^2$ by the same, may be regulated to suit the grade of gasolene by simply adjusting the screw $g'$, said screw being raised when the gasolene is of good quality and but a comparatively small portion is required for an explosion and lowered when the gasolene is poor in quality and a comparatively large portion is necessary to an explosion. The opposite or gravitating movement of the piston $f'$ forces the fuel or gasolene through the pipe $z$ to the carbureter E. This passage of the oil is controlled by the valve $a'$, which is opened to a considerable extent when the apparatus is set so that there will be short intervals between the explosions and is closed more or less when the apparatus is adjusted for long intervals between the explosions. In either case when the charge of fuel or gasolene is delivered through pipe $z$ to the carbureter it falls from one to another of the foraminated plates $x$ and is thereby finely divided, so that when air is drawn from pipe $y$ upwardly through the plates $x$ it is able to take up and commingle with the whole of the charge of gasolene and in conjunction with the same form a rich and highly-inflammable explosive mixture.

The operation described—i. e., the automatic alternate filling of the chamber A with explosive mixture and water—will continue so long as fuel is supplied to the carbureter E and the valve $a'$ is left open, and it may be discontinued by shutting off the supply of fuel to the carbureter or by closing the said valve $a'$. The operation of the apparatus may also be discontinued, when desired, by opening an electric switch (not shown) located in the primary circuit.

To start the apparatus, it is simply necessary to open an air-valve $k^2$ of the explosion-chamber C and inject a charge of gasolene or other fuel into said chamber through the valve $k$. With this done the valves $k$ $k^2$ are closed, and the primary circuit of the induction-coil is closed by hand, when an explosion will take place and will be followed by the automatic operation described.

As will be readily observed, the loose connection shown and described between the arm of the cut-off valve G and the piston H renders it unnecessary to use skilled workmanship in making such parts and their appurtenances, which is a material and important advantage. The conductors Q Q' are the only parts of my improved apparatus that are liable to be affected by weather, and since the said conductors are protected by the cap W and conduit $r'$ it follows that the necessity of building a house or protecting-shed over the apparatus is obviated, which is an important advantage.

Experience has demonstrated that my improved apparatus requires no attention after it is once set in operation and that while it is adapted to raise a large amount of water at each explosion, but an infinitesimal amount of gasolene or fuel is necessary to the making of such explosion, which renders the operation of the apparatus extremely economical.

The openings $s$, which are arranged opposite each other in the cylinder $r$ of the cut-off valve G, constitute a desirable feature of my invention, since they equalize the resistance offered to the movements of said valve and insure free movement of the same.

Having thus described my invention, what I claim is—

1. In an apparatus for producing a vacuum or partial vacuum by explosions, the combination of a closed vessel in which the explosions are produced, the said vessel having a valve-controlled inlet-port and also having an outlet for liquid, a source of explosive-supply connected with the interior of the vessel, electric sparking mechanism comprising a circuit maker and breaker movable in one direction by the discharge of liquid and gases from the closed vessel, and an adjustable governor for regulating the movement of the circuit maker and breaker in the opposite direction, substantially as specified.

2. In an apparatus for producing a vacuum or partial vacuum by explosions, the combination of a closed vessel in which the explosions are produced, the said vessel having a valve-controlled inlet-port and also having an outlet for liquid, a conduit for supplying explosive to the vessel, a cut-off valve controlling said conduit and movable in one direction by the discharge of liquid and gases from the closed vessel, electric sparking mechanism comprising a circuit maker and breaker connected and movable with the cut-off valve, and suitable means for regulating the movement of the cut-off valve in the opposite direction, substantially as specified.

3. In an apparatus for producing a vacuum or partial vacuum by explosions, the combination of a closed vessel in which the explosions are produced, the said vessel having a valve-controlled inlet-port and also having an outlet for liquid, electric sparking mechanism comprising a circuit maker and breaker movable in one direction by the discharge of liquid and gases from the closed vessel, a piston connected with the circuit maker and breaker, and a cylinder containing said piston and having a port and a regulating-valve controlling the same, substantially as specified.

4. In an apparatus for producing a vacuum or partial vacuum by explosions, the combination of a closed vessel in which the explosions are produced, the said vessel having a valve-controlled inlet-port and also having an outlet for liquid, a conduit for supplying explosive to the vessel, a cut-off valve controlling said conduit and movable in one direction by the discharge of liquid and gases from the closed vessel, electric sparking mechanism comprising a circuit maker and breaker connected and movable with the cut-off valve, a piston connected with the cut-off valve, and a cylinder containing said piston and having a port and a regulating-valve controlling the same, substantially as specified.

5. In an apparatus for producing a vacuum or partial vacuum by explosions, the combination of a closed vessel in which the explosions are produced, the said vessel having a valve-controlled inlet-port and also having an outlet for liquid, a valve controlling said outlet, a spring-backed follower arranged above said valve, a conduit for supplying explosive to the vessel, a cut-off valve controlling said conduit and movable in one direction by the discharge of liquid and gases from the vessel through the medium of the follower, electric sparking mechanism comprising a circuit maker and breaker connected and movable with the cut-off valve, a piston connected with the cut-off valve, and a cylinder containing said piston and having a port and a regulating-valve controlling the same, substantially as specified.

6. In an apparatus for producing a vacuum or partial vacuum by explosions, the combination of a closed vessel in which the explosions are produced, the said vessel having a valve-controlled inlet-port and also having an outlet for liquid, a conduit for supplying explosive to the vessel, means for igniting the explosive, a cut-off valve controlling said conduit and movable in one direction by the discharge of liquid and gases from the closed vessel, and means for regulating the movement of the cut-off valve in the opposite direction, substantially as specified.

7. In an apparatus for producing a vacuum or partial vacuum by explosions, the combination of a closed vessel in which the explosions are produced, the said vessel having an outlet for liquid, a receptacle arranged outside the vessel and communicating with the outlet, electric sparking mechanism comprising two circuit makers and breakers, one of which is movable in one direction by the discharge of liquid and gases from the closed vessel, suitable means for regulating the movement of the said circuit maker and breaker in the opposite direction, and a float arranged in the said receptacle and connected with the other circuit maker and breaker, substantially as specified.

8. In an apparatus for producing a vacuum or partial vacuum by explosions, the combination of a closed vessel in which the explosions are produced, the said vessel having a valve-controlled inlet-port and also having an outlet for liquid, a receptacle outside the vessel and communicating with the outlet, a conduit for supplying explosive to the vessel, a cut-off valve controlling said conduit and movable in one direction by the discharge of liquid and gases from the closed vessel, suitable means for regulating the movement of the cut-off valve in the opposite direction, a float arranged in the receptacle, and an electric sparking mechanism comprising two circuit makers and breakers, one of which is connected with the cut-off valve and the other with the float, substantially as specified.

9. In an apparatus for producing a vacuum or partial vacuum by explosions, the combination of a closed vessel in which the explosions are produced, the said vessel having a valve-controlled inlet-port and also having an outlet for liquid, a conduit for supplying explosive to the vessel, means for igniting the explosive, a cut-off valve controlling said conduit and movable in one direction by the discharge of liquid and gases from the closed vessel, means for governing or regulating the movement of the cut-off valve in the opposite direction, a pump-cylinder, a piston therein operative by the cut-off valve, a carbureter, and a fuel-supply pipe connected with the pump-cylinder, and the carbureter, substantially as specified.

10. In an apparatus for producing a vacuum or partial vacuum by explosions, the combination of a closed vessel in which the explosions are produced, the said vessel having a valve-controlled inlet-port and also having an outlet for liquid, a conduit for supplying explosive to the vessel, a cut-off valve controlling said conduit and movable in one direction by the discharge of liquid and gases from the closed vessel, means for governing or regulating the movement of the cut-off valve in the opposite direction, a pump-cylinder, a piston therein operative by the cut-off valve, a carbureter, a pipe between the fuel-supply pipe and the carbureter, and an electric sparking mechanism comprising a circuit maker and breaker movable with the cut-off valve, substantially as specified.

11. In an apparatus for producing a vacuum or partial vacuum by explosions, the combination of a closed vessel in which the explosions are produced, said vessel having a valve-controlled inlet-port and also having an outlet for liquid, a carbureter connected by a conduit with the interior of the closed vessel, a pump-cylinder, a piston movable in said cylinder and operative by the discharge of liquid from the closed vessel, a fuel-supply pipe connected with the pump-cylinder and the carbureter and suitable means for igniting explosive in the closed vessel, substantially as specified.

12. In an apparatus for producing a vacuum or partial vacuum by explosions, a closed vessel in which the explosions are produced, the said vessel comprising a vacuum-chamber having a valve-controlled inlet-port and also having an outlet for liquid, and an explosion-chamber communicating with the vacuum-chamber and having an exhaust-port controlled by an outwardly-opening valve, a source of explosive-supply, a conduit between said source of supply and the vessel, a cut-off valve and a check-valve arranged in the conduit, said check-valve being adapted to open toward the vessel, and suitable means for igniting explosive in the explosion-chamber, substantially as specified.

13. In an apparatus for producing a vacuum or partial vacuum by explosions, the combination of a closed vessel in which the explosions are produced, said vessel having a valve-controlled inlet-port and also having an outlet for liquid, an explosive-supply conduit, a cut-off valve controlling the same and movable in one direction by the discharge of liquid from the vessel, an electric sparking mechanism comprising a circuit maker and breaker connected with the cut-off valve, and governor mechanism for regulating the movement of the cut-off valve in the opposite direction; said mechanism comprising a piston, a cylinder receiving the same, a lubricant-receptacle, tubes connecting the cylinder and the lubricant-receptacle, a non-return valve interposed between the cylinder and one tube, and a regulating-valve controlling the other tube, substantially as specified.

14. In an apparatus for producing a vacuum or partial vacuum by explosions, the combination of a closed vessel in which the explosions are produced, the said vessel having a valve-controlled inlet-port and an outlet for liquid, a conduit for supplying explosive to the vessel, a cut-off valve controlling said conduit, means for igniting the explosive, a cylinder, a gravitating piston arranged in said cylinder and movable in one direction by the discharge of liquid and gases from the vessel, a connection between the piston and cut-off valve, a lubricant-receptacle, tubes interposed between the cylinder and lubricant-receptacle, a non-return valve controlling communication between the cylinder and one tube, and a regulating-valve controlling the other tube, substantially as specified.

15. In an apparatus for producing a vacuum or partial vacuum by explosions, a closed vessel in which the explosions are produced, the said vessel comprising a vacuum-chamber having a valve-controlled inlet-port and also having an outlet for liquid, and an explosion-chamber communicating with the vacuum-chamber and having an exhaust-port controlled by an outwardly-opening valve, and also having a port for the admission of explosive, and suitable means for igniting explosive in the explosion-chambers, substantially as specified.

16. In an apparatus for producing a vacuum or partial vacuum by explosions, the combination of a closed vessel comprising a vacuum-chamber having a valve-controlled inlet and also having an outlet for liquid, and an explosion-chamber communicating with the vacuum-chamber and having an arm provided with a lateral conduit, conducting-rods secured in insulating material in said arm of the explosion-chamber, conducting-wires extending through the lateral conduit of the arm, and a removable bifurcated hood arranged over the arm and straddling the conduit, substantially as specified.

17. In an apparatus for producing a vacuum or partial vacuum by explosions, a closed vessel in which the explosions are produced, said vessel having an inlet and an outlet for liquid, an explosive-supply conduit connected with the interior of the vessel and comprising a casing, a cylinder secured in the casing and having ports connecting its interior with that of the casing, and a reciprocatory cut-off valve movable in the same cylinder, and means for igniting the explosive, substantially as specified.

18. In an apparatus for producing a vacuum or partial vacuum by explosions, the combination of a closed vessel having an inlet and an outlet for liquid, a source of explosive-supply, means for igniting the explosive and a valve for controlling communication between the source of explosive-supply and the interior of the vessel, said valve being operative by the discharge from the vessel and subject to a variable resistance, substantially as specified.

19. In an apparatus for producing a vacuum or partial vacuum by explosions, the combination of a closed vessel having an inlet and an outlet for liquid, a source of explosive-supply, means for igniting the explosive, a valve for controlling communication between the source of explosive-supply and the interior of the vessel, said valve being movable in one direction by the discharge from the vessel, and means for affording a variable resistance to the movement of the valve in the opposite direction, substantially as specified.

20. In an apparatus for producing a vacuum or partial vacuum by explosions, the combination of a closed vessel having an inlet and an outlet for liquid, a source of explosive-supply, a conduit between the source of explosive-supply and the vessel, means for igniting the explosive, a cut-off valve for controlling the conduit, and a check-valve arranged between the vessel and the source of explosive-supply and adapted to open toward the former, substantially as specified.

21. In an apparatus for producing a vacuum or partial vacuum by explosions, the combination of a closed vessel having an inlet for explosive and an inlet and an outlet for liquid, and electric sparking mechanism comprising a circuit maker and breaker movable in one direction by the discharge from the vessel and subject, in its movement in the opposite direction, to a variable resistance, substantially as specified.

22. In an apparatus for producing a vacuum or partial vacuum by explosions, the combination of a closed vessel having an inlet and an outlet for liquid, a source of explosive-supply, a valve for controlling communication between the source of explosive-supply and the interior of the vessel, and a sparking mechanism comprising a circuit maker and breaker; the said valve and circuit maker and breaker being movable in one direction by the discharge from the vessel and subject, in their movement in the opposite direction, to a variable resistance, substantially as specified.

23. In an apparatus for producing a vacuum or partial vacuum by explosions, the combination of a closed vessel having an inlet and an outlet for liquid, a source of explosive-supply, a valve for controlling communication between the source of explosive-supply and the interior of the vessel, a sparking mechanism comprising two circuit makers and breakers, one of which is movable with the cut-off valve in one direction and subject to a variable resistance in its movements in the opposite direction, a receptacle arranged to receive liquid from the discharge of the vessel, and a float arranged in said receptacle and connected to the other circuit maker and breaker, substantially as specified.

24. In an apparatus for producing a vacuum or partial vacuum by explosions, the combination of a closed vessel having an inlet and an outlet for liquid, means for supplying explosive to the vessel, and a sparking mechanism comprising a circuit which is opened incident to the discharge from the vessel following an explosion and is then closed and kept closed until another explosion ensues, substantially as specified.

25. In an apparatus for producing a vacuum or partial vacuum by explosions, the combination of a closed vessel having an inlet and an outlet for liquid, means for supplying explosive to the vessel, and a sparking mechanism comprising a circuit maker and breaker arranged to be raised by the discharge following an explosion and adapted to gravitate and maintain a closure of the circuit until another explosion ensues, substantially as specified.

26. In an apparatus for producing a vacuum or partial vacuum by explosions, the combination of a closed vessel having an inlet and an outlet for liquid, a source of explosive-supply, a valve for controlling communication between the source of explosive-supply and the interior of the vessel, said valve being operative by the discharge from the vessel and subject to a variable resistance, and a sparking mechanism comprising a circuit maker and breaker movable with the valve and adapted on its down movement to effect and maintain a closure of the circuit until an explosion ensues, substantially as specified.

27. In an apparatus for producing a vacuum or partial vacuum by explosions, the combination of a closed vessel having an inlet and an outlet for liquid, a carbureter, a conduit between said carbureter and the vessel, a cut-off valve controlling said conduit, said valve being movable in one direction by the discharge from the vessel and subject to a variable resistance on its movement in the opposite direction, a cylinder, a gravitating piston arranged therein and movable in one direction with the cut-off valve, a fuel-supply conduit connected to the cylinder and having a check-valve, a conduit connected to the fuel-supply conduit, between the valve thereof and the cylinder, and also connected to the carbureter, and a sparking mechanism comprising a circuit maker and breaker movable with the cut-off valve, substantially as specified.

28. In an apparatus for producing a vacuum or partial vacuum by explosions, the combination of a closed vessel in which the explosions are produced, the said vessel having a valve-controlled inlet-port and an outlet for liquid, a carbureter connected with the interior of the vessel, means for igniting explosive, a cylinder, a fuel-supply conduit connected to the cylinder and equipped with a non-return valve, a conduit connected to said supply-conduit, between the valve thereof and the cylinder and also connected to the carbureter, a piston, in the cylinder, movable in one direction by the discharge of liquid and gases from the vessel, and an adjustable device for limiting the movement of the piston in the opposite direction, substantially as specified.

29. The combination of a carbureter, a combined pump and measure having a piston and means for limiting the movement thereof in one direction, a fuel-supply conduit connected to said pump and measure and having a check-valve, and a conduit connected to said supply-conduit, between the pump and measure and the check-valve thereof, and also connected to the carbureter, and means for moving said piston in one direction, substantially as specified.

30. In an apparatus for producing a vacuum or partial vacuum by explosions, the combination of a closed vessel in which the explosions are produced, said vessel having an inlet and an outlet for water, an explosive-supply conduit, a cut-off valve therefor, means for igniting the explosive and a piston loosely connected with the cut-off valve; said piston being movable in one direction by the discharge from the vessel and subject on its movement in the opposite direction to a variable resistance, substantially as specified.

31. In an apparatus for producing a vacuum or partial vacuum by explosions, the combination of a closed vessel in which the explosions are produced, said vessel having an inlet for explosive and an inlet and an outlet for water, means for igniting the explosive, a piston-cylinder having an enlargement at its upper end, a liquid-receptacle connected with the piston-cylinder, and a piston arranged in the cylinder and operative by the discharge from the closed vessel, substantially as specified.

32. In an apparatus for producing a vacuum or partial vacuum by explosions, the combination of a closed vessel in which the explosions are produced, said vessel having an inlet and also having an outlet for water, a valve controlling the outlet, a spring-backed follower arranged above the valve, an explosive-supply conduit connected to the vessel, a cut-off valve therein, a piston loosely connected to the cut-off valve and movable by the follower, and means for igniting the explosive, substantially as specified.

33. In an apparatus for producing a vacuum or partial vacuum by explosions, the combination of an explosion-chamber having an inlet for explosive and an outlet for products of combustion and also having a lateral branch provided with a downwardly-inclined conduit, electric conducting-rods secured in the said branch, circuit-wires connected to the conducting-rods and extending through the conduit, and a bifurcated cap arranged over the branch of the explosion-chamber and straddling the conduit, substantially as specified.

34. In an apparatus for producing a vacuum or partial vacuum by explosions, a closed vessel comprising a vacuum-chamber having an inlet and an outlet for liquid, and an explosion-chamber, an exhaust-conduit connected with the explosion-chamber and containing a non-return valve, an explosive-supply conduit connected with the explosion-chamber and comprising a casing and a cylinder secured in the casing and communicating with the interior of the same by ports that are exactly equal and opposite, and a cut-off valve arranged in the cylinder and movable in one direction by the discharge from the vessel and subject, on its movement in the opposite direction, to a variable resistance, substantially as specified.

35. In an apparatus for producing a vacuum or partial vacuum by explosions, the combination of a closed vessel in which the explosions are produced, said vessel having an inlet and an outlet for liquid, an explosive-supply conduit connected with the interior of the vessel and embracing a cylinder communicating with it at one end and at opposite points intermediate of its ends, and a gravitating cut-off valve arranged in said cylinder and movable in one direction by the discharge from the valve, and means for igniting the explosive, substantially as specified.

In testimony whereof I have hereunto set my hand in presence of two subscribing witnesses.

FREDERICK J. F. BRUGUIERE.

Witnesses:
JESSIE G. CRONEY,
C. H. RAEDER.